United States Patent
Bai et al.

(10) Patent No.: US 10,661,382 B2
(45) Date of Patent: May 26, 2020

(54) SLM FORMING DEVICE FOR MULTIPLE METAL POWDER MATERIALS

(71) Applicant: North University of China, Shanxi (CN)

(72) Inventors: Peikang Bai, Shanxi (CN); Zhanyong Zhao, Shanxi (CN); Bin Liu, Shanxi (CN); Xibin Yan, Shanxi (CN); Jianhong Wang, Shanxi (CN); Jingzhi Dang, Shanxi (CN)

(73) Assignee: North University of China, Shanxi (CN)

( * ) Notice: Subject to any disclaimer, the term of this patent is extended or adjusted under 35 U.S.C. 154(b) by 327 days.

(21) Appl. No.: 15/832,788

(22) Filed: Dec. 6, 2017

(65) Prior Publication Data
US 2018/0154480 A1    Jun. 7, 2018

(30) Foreign Application Priority Data
Dec. 7, 2016    (CN) .......................... 2016 1 1115897

(51) Int. Cl.
*B23K 26/00*     (2014.01)
*B23K 26/03*     (2006.01)
(Continued)

(52) U.S. Cl.
CPC .......... *B23K 26/0093* (2013.01); *B22F 3/004* (2013.01); *B22F 3/1055* (2013.01);
(Continued)

(58) Field of Classification Search
CPC .......................... B23K 26/0093; B23K 26/082; B23K 26/144; B23K 26/342; B23K 26/032;
(Continued)

(56) References Cited

U.S. PATENT DOCUMENTS 6,815,636 B2 * 11/2004 Chung ............... G05D 23/1919
                                                                 219/121.65
7,153,463 B2 * 12/2006 Leuterer ................ B33Y 10/00
                                                                 264/308
(Continued)

FOREIGN PATENT DOCUMENTS

CN        201300207 Y       9/2009
CN        101678613 A       3/2010
(Continued)

OTHER PUBLICATIONS

US 10,507,527 B2, 12/2019, Romano (withdrawn)*

*Primary Examiner* — Frederick C Nicolas
(74) *Attorney, Agent, or Firm* — Gang Yu (57) ABSTRACT

The invention discloses a Selective Laser Melting forming device for multiple metal powder materials. Technical solutions adopted are as follows: a collector container, a build cylinder and a feed container are provided on a lower portion of a process chamber; leveling oil cylinders for the substrate are mounted in the build cylinder; a recoater bracket in the process chamber is slidably mounted on a slide rail; a recoater is fixed on a lower portion of the recoater bracket; a compaction roller is simultaneously mounted on the recoater bracket; a stress sensor is provided under the compaction roller; an electron microscope for collecting the porosity of the spread powder and the product and a melting pool monitoring Charge Coupled Device camera; a laser scanning system, a directional heating laser system and an alarm device are provided on a top portion of the process chamber.

7 Claims, 8 Drawing Sheets

(51) Int. Cl.
- *B23K 26/082* (2014.01)
- *B23K 26/144* (2014.01)
- *B23K 26/342* (2014.01)
- *B22F 3/00* (2006.01)
- *B22F 3/105* (2006.01)
- *B33Y 30/00* (2015.01)
- *B33Y 50/02* (2015.01)

(52) U.S. Cl.
CPC .......... *B23K 26/032* (2013.01); *B23K 26/034* (2013.01); *B23K 26/082* (2015.10); *B23K 26/144* (2015.10); *B23K 26/342* (2015.10); *B33Y 30/00* (2014.12); *B33Y 50/02* (2014.12); *B22F 2003/1056* (2013.01); *B22F 2203/00* (2013.01); *B22F 2998/10* (2013.01); *B22F 2999/00* (2013.01)

(58) Field of Classification Search
CPC ...... B23K 26/034; B33Y 30/00; B33Y 50/02; B22F 3/004; B22F 3/1055; B22F 2003/1056; B22F 2203/00; B22F 2998/10; B22F 2999/00; B22F 3/02
See application file for complete search history.

(56) References Cited

U.S. PATENT DOCUMENTS

| | | | | |
|---|---|---|---|---|
| 8,073,315 B2 * | 12/2011 | Philippi | ................ | B22F 3/1055 |
| | | | | 392/407 |
| 8,137,739 B2 * | 3/2012 | Philippi | ................ | B29C 64/153 |
| | | | | 427/8 |
| 8,525,071 B2 * | 9/2013 | Leuterer | ................ | B22F 3/003 |
| | | | | 219/121.65 |
| 9,505,057 B2 * | 11/2016 | Nordkvist | ............ | B22F 1/0014 |
| 9,561,542 B2 * | 2/2017 | Ackelid | ............. | B22F 1/0085 |
| 9,718,129 B2 * | 8/2017 | Ljungblad | ............ | B22F 3/1055 |
| 10,449,696 B2 * | 10/2019 | Elgar | ................... | B29C 64/364 |
| 2004/0200816 A1 | 10/2004 | Chung et al. | | |

FOREIGN PATENT DOCUMENTS

| | | |
|---|---|---|
| CN | 204308193 U | 5/2015 |
| CN | 204547086 U | 8/2015 |
| CN | 105033251 A | 11/2015 |
| CN | 204735713 U | 11/2015 |
| CN | 204892951 U | 12/2015 |
| CN | 105880591 A | 8/2016 |
| CN | 106041080 A | 10/2016 |
| CN | 106141184 A | 11/2016 |
| CN | 206343623 U | 7/2017 |

* cited by examiner

SLM FORMING DEVICE FOR MULTIPLE METAL POWDER MATERIALS

TECHNICAL FIELD

The present disclosure relates to a Selective Laser Melting (SLM) forming device for multiple metal powder materials, and belongs to a technical field of Three-Dimensional (3D) printing material additive manufacturing.

BACKGROUND

A 3D printing technology is a technology that is opposite to the conventional material processing method and constructs a 3D object by overlapping materials layer by layer based on 3D Computer Aided Design (CAD) model data. The 3D printing is based on a 3D model, takes materials like a high molecular plastic, a photosensitive resin, a metal powder and a film coating powder as raw materials and implements the manufacturing of the 3D model in a principle of overlapping the materials layer by layer. The 3D printing technology is a combination of a CAD, a mechanical automation and other technologies, such that the manufacturing process is simplified, a development period of a new product is shortened and the development cost and risk are reduced. It is considered as a third industrial revolution.

In the technical field of the 3D printing, an SLM forming technology is one of the technologies with the most development potential. It directly melts a metal powder using a high-energy beam laser and forms a high-performance metal part. During the SLM forming process, a 3D model of a part is designed on a computer first, then the 3D model is sliced and layered to obtain Two-Dimensional (2D) contour data of each cross section, and thereafter a processed data is imported to a forming device. When the forming device works, a feed container is first lifted to a certain height, a layer of the powder is spread on a build cylinder uniformly by a recoater, and the computer controls a 2D scanning trace of a laser beam according to a prototype slicing model such that a metal powder material is selectively melted and solidified to form a layer of the part. After the contour of this layer is scanned completely, the above steps are repeated to perform laser melting forming of a next layer till the whole part is processed completely to form a 3D metal part. The technology can manufacture a metal product with a complex shape, makes a formed part have good performance and high precision and therefore has important applications in fields such as medicine, aerospace and military.

At present, during the SLM forming process, there still exists the following problems to be solved.

① A substrate is difficult to level automatically. To reduce the warping deformation of the part, the product is generally sintered on the substrate such that the product and the substrate are formed into one whole structure. Currently, the substrate is mainly leveled manually by a feeler gauge, so an adjustment process is troublesome, the accuracy is low and the forming efficiency is reduced.

② The porosity of the spread powder and the product is difficultly monitored. During the forming process, the internal porosity of the spread powder and the product directly affects a property of the product. Currently, during the SLM forming process, the internal porosity of the spread powder and the product cannot be detected. If there are more unqualified pores inside the product, the forming will be performed again, such that not only the forming efficiency is reduced, but the material is also wasted.

③ During the forming process, the melting pool is difficultly monitored. During the forming process, the stability of the melting pool directly affects the dimensional accuracy and the mechanical performance of the formed product. During the SLM forming process, the melting pool is largely affected by factors such as a laser power, a beam scanning speed, a gas component, an air flow, a material performance and a layer thickness. Hence, there is a need for a monitoring system to have a fast shooting speed and a relatively large data volume and to implement signal processing. The common monitoring devices cannot implement real-time monitoring.

④ The formed part is easy to occur warping deformation. During the forming process, a thin-walled portion of the formed part is cooled rapidly, such that an internal temperature is distributed non-uniformly, the warping deformation of the formed part is caused easily, the product performance is reduced or even a waste part is formed; and thus, the rate of finished products is reduced.

SUMMARY

The present invention overcomes shortages of the prior art and provides an SLM forming device for multiple metal powder materials, which is simple in operation and wide in a scope of application, has a substrate automatically leveled, automatically monitors a porosity of powder and a product in build cylinder as well as a melting pool and is capable of controlling warping deformation of a part.

To solve the above technical problem, technical solutions adopted by the present invention are as follows: the SLM forming device for the multiple metal powder materials comprises a forming chamber; a collector container, a build cylinder and a feed container are provided on a lower portion of the forming chamber; the build cylinder is provided between the collector container and the feed container; lifting devices are respectively provided in the collector container, the build cylinder and the feed container; material pushing bottom plates are respectively provided on the lifting devices; heating devices and insulating layers are respectively provided out of the collector container, the build cylinder and the feed container; a substrate is provided on a bottom plate of the build cylinder; leveling oil cylinders are mounted between the bottom plate and the substrate;

a slide rail is provided on a middle portion of the forming chamber; a recoater bracket is slidably mounted on the slide rail; the recoater bracket is connected with a motor via a belt; a recoater is fixed on a lower portion of the recoater bracket; a roller frame is hinged to the recoater bracket; a compaction roller is mounted on the roller frame; torsional springs are respectively provided at two sides of the roller frame; a stress sensor is provided under the compaction roller;

one side of an upper portion of the forming chamber is provided with an electron microscope for collecting a porosity of spread powder and a product, and the other side of the upper portion of the forming chamber is provided with a high-precision melting pool monitoring Charge Coupled Device camera; Light-Emitting Diode lamps are provided between the electron microscope and the CCD camera;

a laser scanning system, a directional heating laser system and an alarm device are provided on a top portion of the forming chamber; an air intake and exhaust device is provided on a rear wall of the forming chamber; a master control system is provided on a sidewall of the forming chamber.

Preferably, each of the lifting devices in the collector container, the build cylinder and the feed container is a hydraulic lifting device, or a mechanical lifting device; the lifting devices are connected with the master control system.

Preferably, each of the heating devices out of the collector container, the build cylinder and the feed container is a heating plate; a heating pipe arranged continuously in a U-shaped structure is provided in the heating plate; the insulating layers are high temperature resistant aluminum silicate felts and are 20-30 mm thick; the heating pipe is connected with the master control system.

Preferably, a plurality of heating grooves are provided on the substrate; a heating wire and a second temperature measuring thermocouple are provided in each of the heating groove; the heating wire and the second temperature measuring thermocouple all are connected with the master control system.

Preferably, the leveling oil cylinders are provided at four corners of the substrate; cylinder bodies of the leveling oil cylinders are fixed on the bottom plate; piston rods are fixed on a bottom portion of the substrate; the leveling oil cylinders are connected with the master control system.

Preferably, the stress sensor under the compaction roller comprises a deformation body, a resistance strain type sensor and an Analog-to-Digital conversion circuit; the stress sensor is connected with the master control system.

Preferably, a transparent protective cover is provided outside of the electron microscope and the CCD camera; the transparent protective cover is made of a transparent quartz glass; the electron microscope and the CCD camera are connected with the master control system.

Compared with the prior art, the present invention has the following beneficial effects: it is achieved that the substrate is automatically leveled and the complex process of manual adjustment is omitted; a porosity of the spread powder and the product can be monitored, the alarm can be performed, the re-spreading, compaction or process parameter adjustment are performed on formed powder and the product compactness is improved; a temperature, a shape and an area of the melting pool can be monitored in real time, and an online evaluation is performed on a forming accuracy and a laser power, such that the forming stability is guaranteed; the directional heating can be performed on a formed part, such that the uniform distribution of a temperature in the formed part is implemented, and a warping deformation of the formed part in a forming process is prevented due to non-uniform temperature distribution; the quality and the production efficiency of the formed part are improved, thereby having an important significance to the development of an SLM forming technology; and meanwhile, the scope of application is wide and the laser melting forming of materials such as a stainless steel, a die steel, a cobalt-chromium alloy, a nickel alloy, an aluminum alloy and an iron-based alloy can be performed.

BRIEF DESCRIPTION OF THE DRAWINGS

The present invention will be further described below with reference to accompanying drawings.

In the drawings: 1: forming chamber, 2: oxygen sensor, 3: transparent protective cover, 4: electron microscope, 5: LED lamp, 6: laser scanning system, 7: directional heating laser system, 8: alarm device, 9: CCD camera, 12: air inlet cover, 13: master control system, 14: motor, 15: belt, 16: collector container, 17: build cylinder, 18: air outlet cover, 19: feed container, 20: recoater, 21: recoater bracket, 22: torsional spring, 23: stress sensor, 24: roller frame, 25: rotating wheel, 26: compaction roller, 27: gas circulation device, 28: air exhaust pipeline, 29: air intake pipeline, 30: sealing cover, 31: slide rail, 32: recoater fixing bolt, 33: belt fixing bolt, 35: heating device, 36: insulating layer, 37: insulating layer fixing bolt, 38: beam, 39: substrate, 40: levelling oil cylinder, 41: material pushing bottom plate, 42: piston rod, 43: hydraulic oil cylinder, 44: heating pipe, 45: first temperature measuring thermocouple, 46: a heating groove, 47: a second temperature measuring thermocouple, 48: heating wire, 49: AD conversion circuit, 50: resistance strain type sensor, 51: deformation body, 52: laser, 53: optical fiber, 54: beam expander, 55: scanning galvanometer, 56: L-shaped directional pipe, 57: focusing mirror, 58: upper alarm lamp, 59: middle alarm lamp, 60: lower alarm lamp, 61: buzzer, 62: bracket.

DETAILED DESCRIPTION OF THE EMBODIMENTS

As shown in FIG. 1 to FIG. 5, an SLM forming device for multiple metal powder materials comprises a forming chamber 1; a collector container 16, a build cylinder 17 and a feed container 19 are provided on a lower portion of the forming chamber 1; the build cylinder 17 is provided between the collector container 16 and the feed container 19; hydraulic oil cylinders 43 are respectively provided in the collector container 16, the build cylinder 17 and the feed container 19; a material pushing bottom plate 41 is provided on a piston rod 42 of each of the hydraulic oil cylinders 43; heating devices 35 and insulating layers 36 are respectively arranged out of the cylinders; each of the heating devices 35 is a heating plate; a heating pipe 44 that is continuously arranged in a U-shaped structure and a first temperature measuring thermocouple 45 are provided in the heating plate; the insulating layers 36 are a high temperature resistant aluminum silicate felts and are 20-30 mm thick; the heating devices 35 and the insulating layers 36 are fixed on the cylinders by insulating layer fixing bolts 37 and beams 38; a substrate 39 is provided on a material pushing bottom plate 41 inside the build cylinder 17; a plurality of heating grooves 46 are provided on the substrate 39; a heating wire 48 and a second temperature measuring thermocouple 47 are provided in each of the heating grooves; leveling oil cylinders 40 for the substrate 39 are mounted between the bottom plate and the substrate 39; the four leveling oil cylinders 40 are respectively mounted at four corners of the material pushing bottom plate 41; cylinder bodies of the leveling oil cylinders 40 are fixed on a material pushing bottom plate 41; the piston rods are fixed on a bottom portion of the substrate 39.

As shown in FIG. 1, FIG. 6 to FIG. 8, a slide rail 31 is provided on a middle portion of the forming chamber; a recoater bracket 21 is slidably mounted on the slide rail 31; the recoater bracket 21 is connected with a motor 14 via a belt 15; the belt 15 is fixed on the recoater bracket 21 by a belt fixing bolt 33; an other end of the belt 15 is connected with a rotating wheel 25; the motor 14 and the rotating wheel 25 are respectively mounted at internal two sides of the forming chamber 1; a recoater 20 is fixed on a lower portion of the recoater bracket 21 by a recoater fixing bolt 32; one end of a roller frame 24 is hinged to the recoater bracket 21; a compaction roller 26 is mounted on the roller frame 24; torsional springs 22 are respectively mounted at two sides of the roller frame 24; stress sensors 23 are mounted under the compaction roller 26; each of the stress sensors 23 is mainly composed of a deformation body 51, a resistance strain type sensor 50 and an AD conversion circuit 49. When the levelling work is performed, 1) the compaction roller 26 is adjusted to a most left side of the substrate 39; at this moment, the stress sensors 23 mounted under the compaction roller 26 transfer pressure values to a master control system 13; the master control system 13 adjusts heights of two levelling oil cylinders 40 under a left side of the substrate 39 according to data fed back by the stress sensors 23, such that the values of the stress sensors 23 mounted at two sides of the compaction roller 26 are consistent; 2) the compaction roller 26 is adjusted to a most right side of the substrate 39, and the master control system 13 adjusts heights of the two levelling oil cylinders 40 under the most right side of the substrate 39 according to a value of the stress sensor 23 at the most left side, such that the values of the stress sensors 23 at the most right side and the most left side are consistent. At this moment, the whole substrate 39 is in a leveled state.

Figure 1:
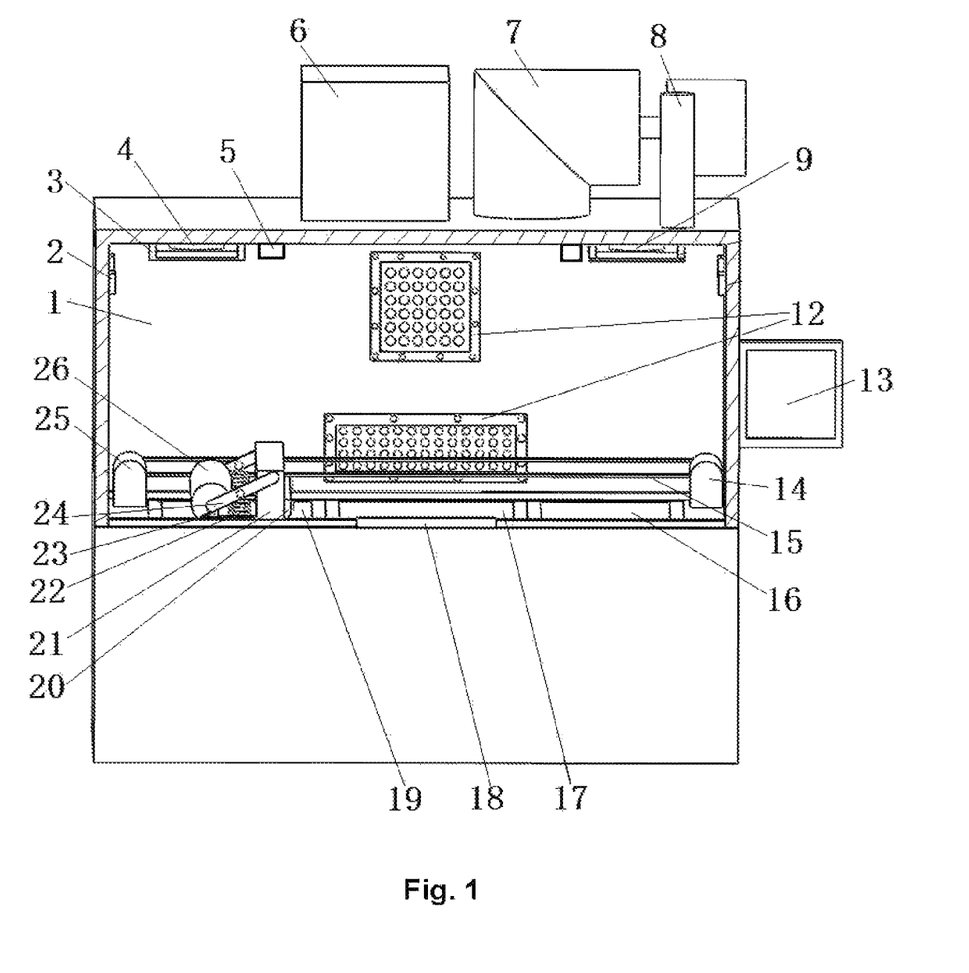
FIG. 1 is a first structure diagram of the present invention.
Figure 2:
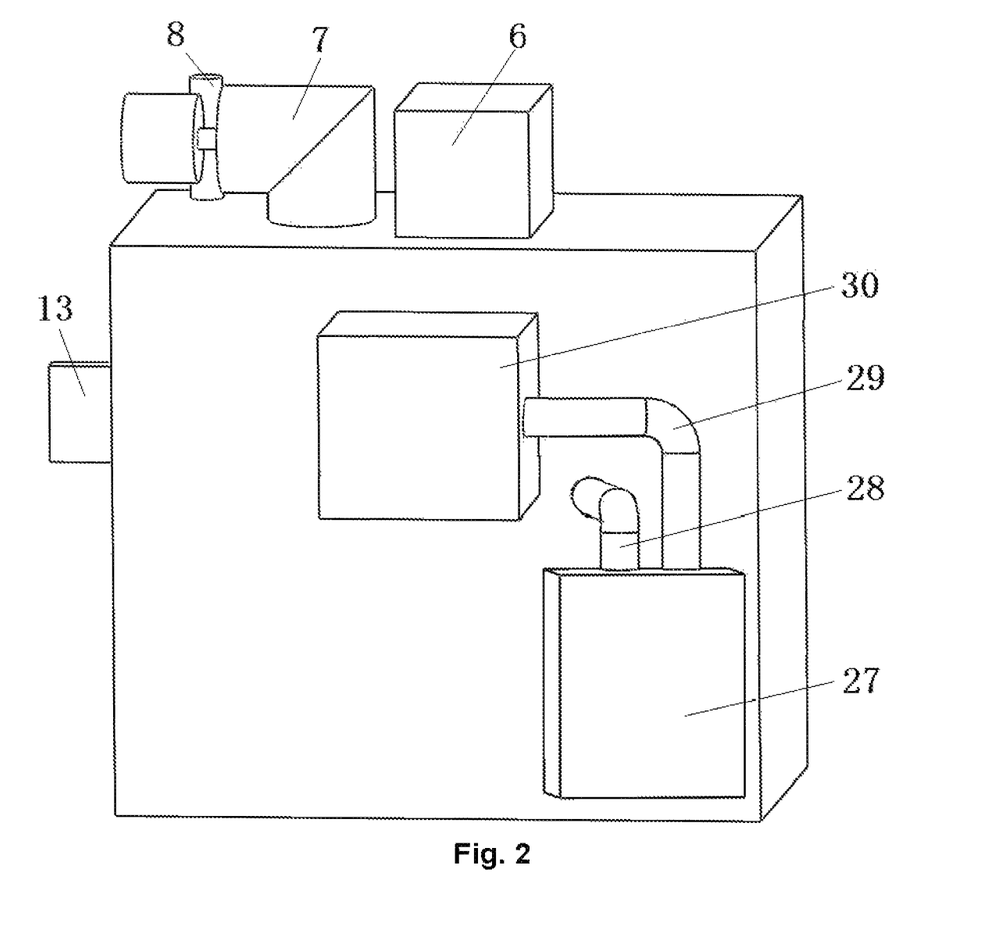
FIG. 2 is a second structure diagram of the present invention.
Figure 3:
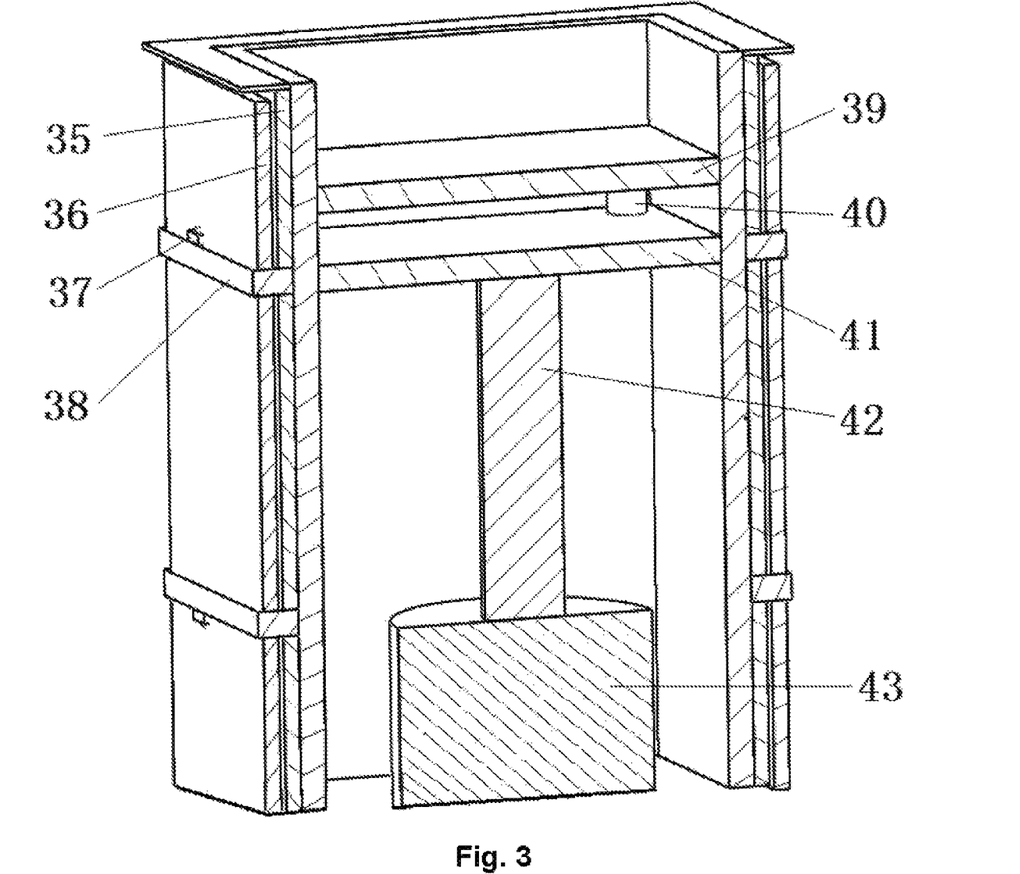
FIG. 3 is a structure diagram of a build cylinder in the present invention.
Figure 4:
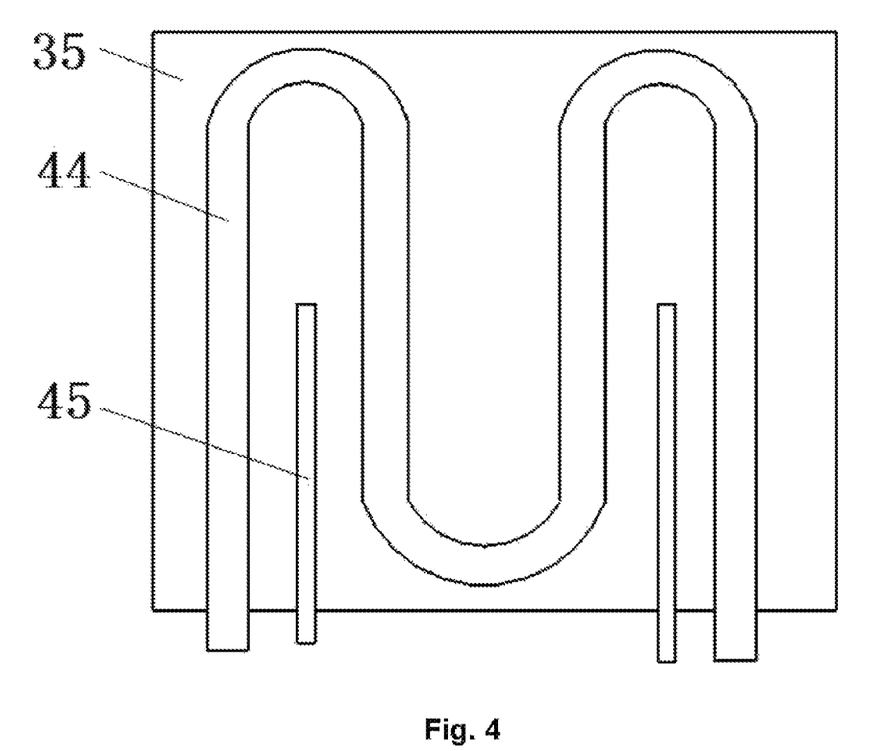
FIG. 4 is a structure diagram of a heating device out of a cylinder in the present invention.
Figure 5:
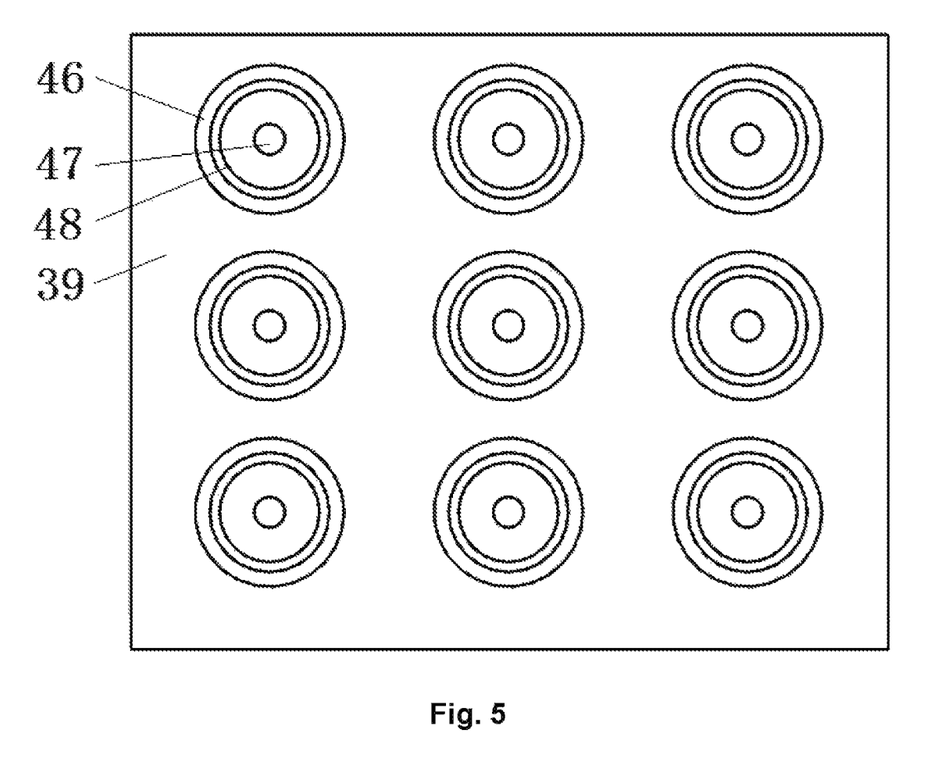
FIG. 5 is a structure diagram of a substrate in the present invention.
Figure 6:
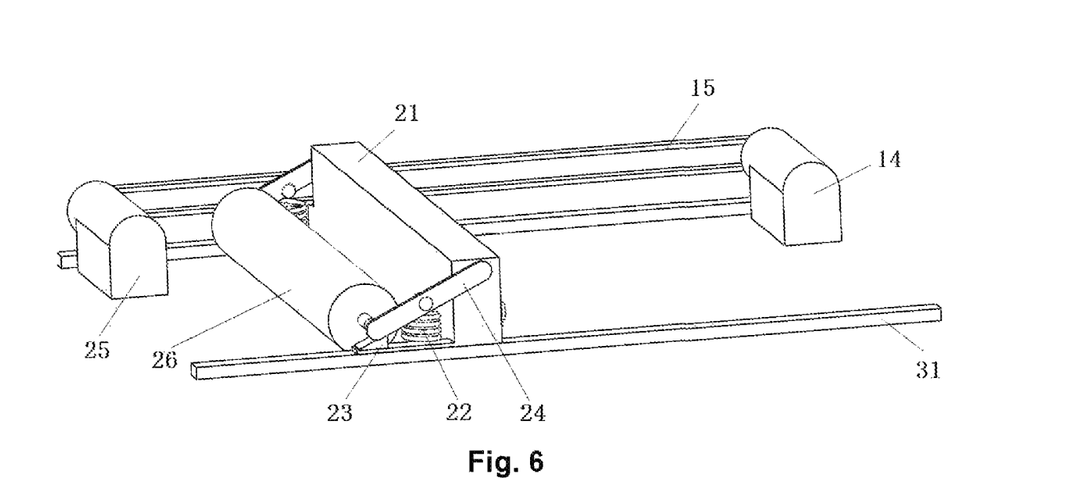
FIG. 6 is a first structure diagram of a powder spreading device in the present invention.
Figure 7:
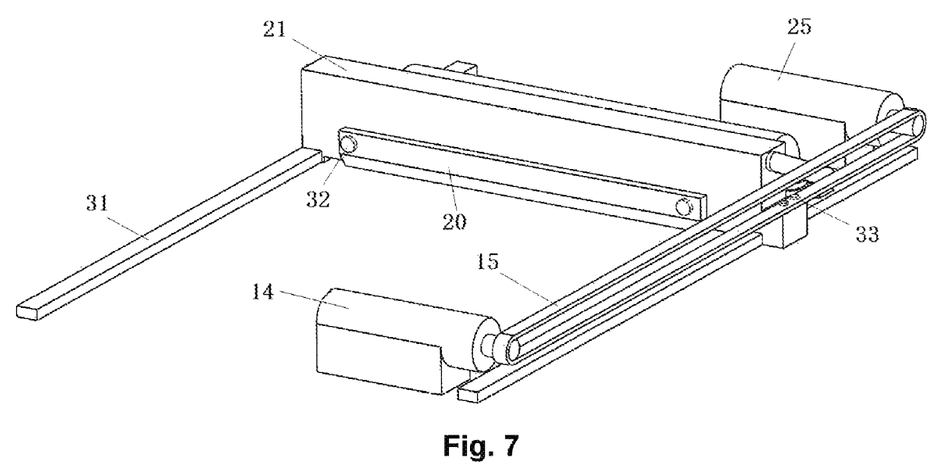
FIG. 7 is a second structure diagram of a powder spreading device in the present invention.
Figure 8:
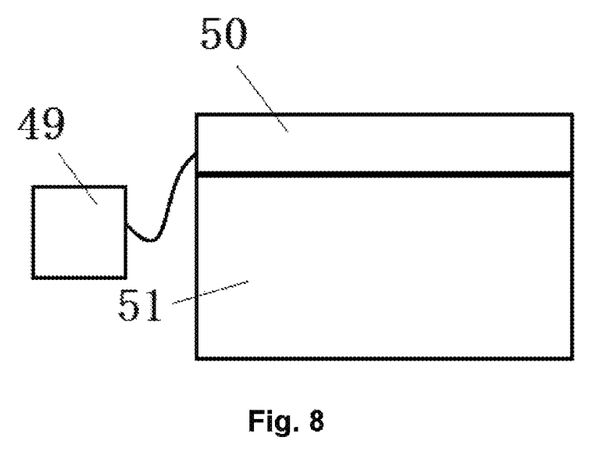
FIG. 8 is a structure diagram of a stress sensor under a compaction roller in the present invention.

As shown in FIG. 1, one side of an upper portion of the forming chamber 1 is provided with an electron microscope 4 for collecting a porosity of spread powder and a product, and the other side of the upper portion of the forming chamber 1 is provided with a high-precision melting pool monitoring CCD camera 9; a shooting and sampling speed of the CCD camera is greater than 2 mm/s and a formed data flow is greater than 520 Mb/s; LED lamps 5 are mounted between the electron microscope 4 and the CCD camera 9; a transparent protective cover 3 is provided out of the electron microscope 4 and the CCD camera 9; the transparent protective cover 3 is made of a transparent quartz glass. When the porosity of the spread powder and the product is detected, 1) the electron microscope 4 shoots a surface of the spread powder and feeds picture information to the master control system 13; 2) the master control system 13 performs automatic recognition, statistics and analysis on pores of the spread powder after receiving the picture information; if the porosity of the spread powder meets a set requirement, the laser melting forming is performed; if the porosity exceeds the set requirement, an alarm 8 is started so as to remind an operator of spreading the powder again and compacting the powder; 3) after the melting forming, the electron microscope 4 shoots a cross section of a product and feeds picture information to the master control system 13; and 4) the master control system 13 performs automatic recognition, statistics and analysis on pores on a cross section of the product; if the porosity on the cross section of the product meets the set requirement, the next powder spreading and laser melting forming are performed; if the porosity exceeds the set requirement, the alarm system is started so as to remind the operator of adjusting process parameters. When the melting pool is monitored in real time, 1) the high-precision melting pool monitoring CCD camera 9 shoots the melting pool and feeds a picture of the melting pool to the master control system 13; the master control system 13 performs an analysis on a temperature, a shape and an area of the melting pool, calculates a practical working power of a forming laser and compares it with a set value; and 2) the master control system 13 adjusts a power of a laser scanning system 6 according to the above information so as to control the metal melting pool and control the precision and the mechanical performance of a formed product.

Figure 9:
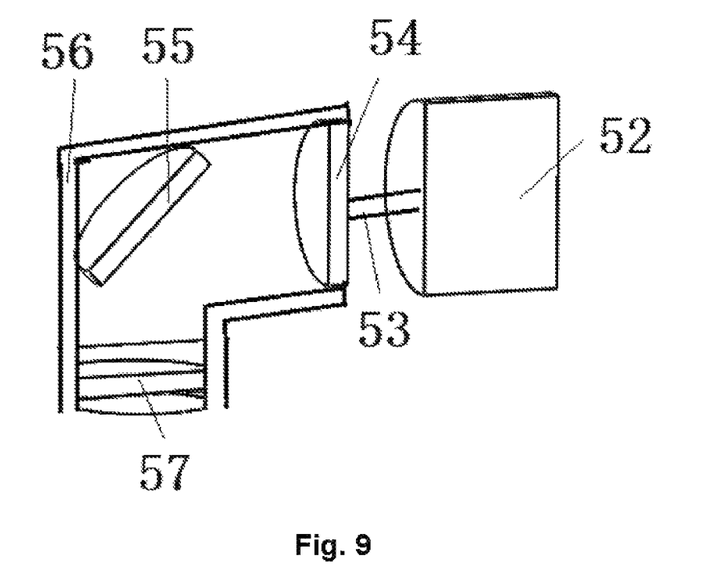
FIG. 9 is a structure diagram of a directional heating laser system in the present invention.
Figure 10:
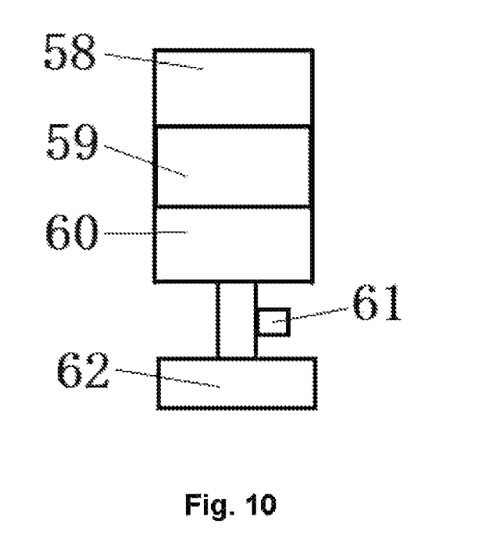
FIG. 10 is a structure diagram of an alarm device in the present invention.
Figure 11:
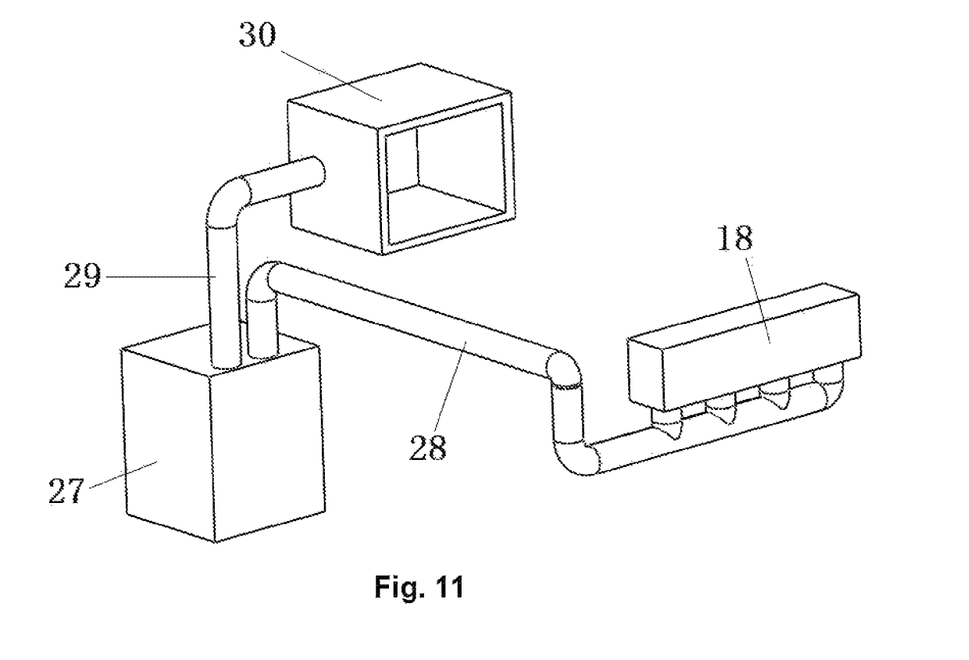
FIG. 11 is a first structure diagram of a gas circuit system in the present invention.
Figure 12:
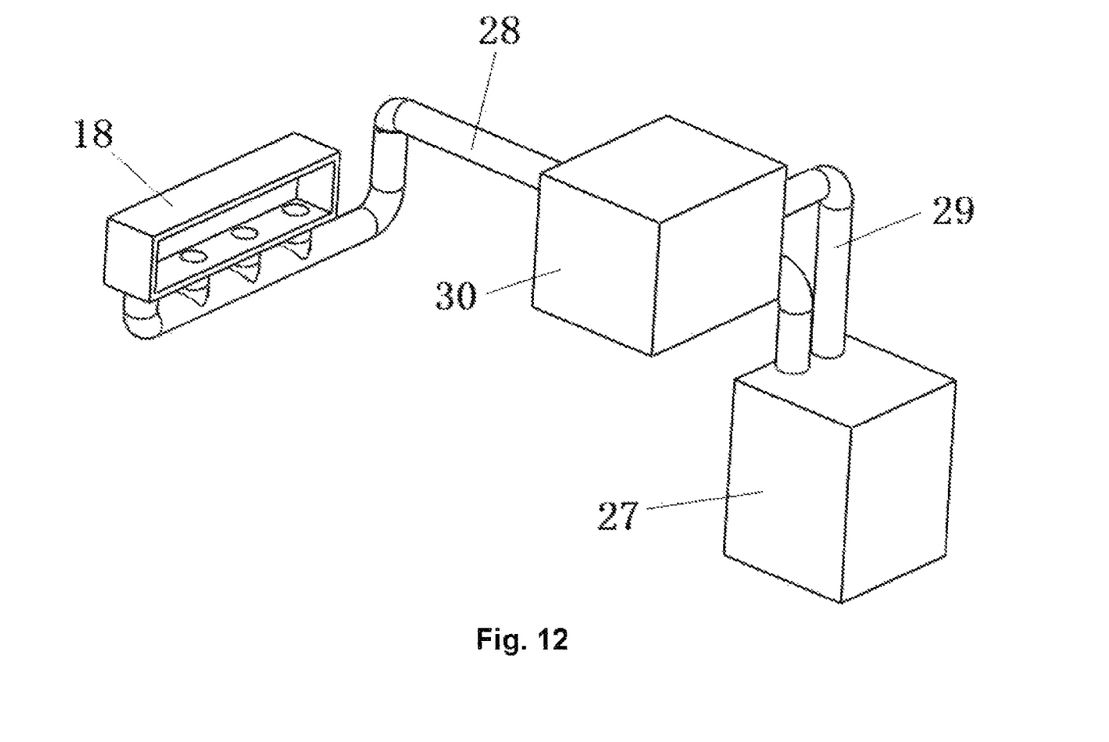
FIG. 12 is a second structure diagram of a gas circuit system in the present invention.

As shown in FIG. 1, FIG. 9 and FIG. 10, a laser scanning system 6, a directional heating laser system 7 and the alarm device 8 are provided on a top portion of the forming chamber; the directional heating laser system 7 comprises an L-shaped directional pipe 56 and the laser 52; one end of the L-shaped directional pipe 56 is provided with a focusing mirror 57, and the other end of the L-shaped directional pipe 56 is provided with a beam expander 54 and the laser 52; a scanning galvanometer 55 is further provided in the L-shaped directional pipe 56; a long pulse laser is mainly adopted by the laser 52; the laser-52 is connected with the beam expander 54 by an optical fiber 53; the directional heating laser system 7 mainly performs a heat treatment on a cross section of a formed part and cannot melt the formed powder or the formed part. The alarm device 8 is mainly composed of an upper alarm 58, a middle alarm 59, a lower alarm 60 and a buzzer 61; a working voltage of the alarm device 8 is 24V; the alarm device 8 is mounted on the bracket 62.

As shown in FIG. 1, FIG. 2, FIG. 11 and FIG. 12, an air intake and exhaust device is provided on a rear wall of the forming chamber 1; the air intake and exhaust device is mainly composed of an air inlet cover 12 and an air outlet cover 18 arranged in the forming chamber; the air inlet cover 12 and the air outlet cover 18 both are connected with a gas circulation device 27 by a sealing cover 30, an air intake pipeline 29 and an air exhaust pipeline 28; oxygen sensors 2 are mounted on inner walls of the forming chamber 1; the oxygen sensors 2 are configured to measure an oxygen content in the forming chamber and feeds information about the oxygen content to the master control system, thereby adjusting an air intake amount of an inert gas via the gas circulation device 27; the air outlet cover 18 is mounted at a front end of the forming chamber 1; the air outlet cover 18 is connected with the gas circulation device 27 by the air exhaust pipeline 28, thereby implementing supply and circulation of a protective gas.

The master control system 13 is provided on a sidewall of the forming chamber 1; the above devices all are connected with the master control system 13. The above describes the embodiments of the present invention in detail with reference to the accompanying drawings. However, the present invention is not limited to the above embodiment. Those of ordinary skill in the art, within their range of knowledge, further can make various changes on the premise of not departing from the objective of the present invention.

What is claimed is:

1. A selective laser melting forming device for multiple metal powder materials, wherein comprising: a process chamber (1), wherein a collector container (16), a build cylinder (17) and a feed container (19) are provided on a lower portion of the process chamber (1); the build cylinder (17) is provided between the collector container (16) and the feed container (19); lifting devices are respectively provided in the collector container (16), the build cylinder (17) and the feed container (19); material pushing bottom plates (41) are respectively provided on the lifting devices; heating devices (35) and insulating layers (36) are respectively provided out of the collector container (16), the build cylinder (17) and the feed container (19); a substrate (39) is provided on a bottom plate of the build cylinder (17); leveling oil cylinders (40) are mounted between the bottom plate and the substrate (39);

a slide rail (31) is provided on a middle portion of the process chamber (1); a recoater bracket (21) is slidably mounted on the slide rail (31); the recoater bracket (21) is connected with a motor (14) via a belt (15); a recoater (20) is fixed on a lower portion of the recoater bracket (21); a roller frame (24) is hinged to the recoater bracket (21); a compaction roller (26) is mounted on the roller frame (24); torsional springs are respectively provided at two sides of the roller frame (24); a stress sensor (23) is provided under the compaction, roller (26);

one side of an upper portion of the process chamber (1) is provided with an electron microscope (4) for collecting a porosity of spread powder and a product, and the other side of the upper portion of the process chamber (1) is provided with a high-precision melting pool monitoring charge coupled device camera (9); light-emitting diode lamps (5) are provided between the electron microscope (4) and the charge coupled device camera (9);

a laser scanning system (6), a directional heating laser system (7) and an alarm device (8) are provided on a top portion of the process chamber (1); an air intake and exhaust device is provided on a rear wall of the process chamber (1); a master control system (13) is provided on a sidewall of the process chamber (1).

2. The selective laser melting forming device for the multiple metal powder materials as claimed in claim 1, wherein each of the lifting devices in the collector container (16), the build cylinder (17) and the feed container (19) is a hydraulic lifting device, or a mechanical lifting device; the lifting devices are connected with the master control system (13).

3. The selective laser melting forming device for the multiple metal powder materials as claimed in claim 1, wherein each of the heating devices (35) out of the collector container (16), the build cylinder (17) and the feed container (19) is a heating plate; a heating pipe arranged continuously in a U-shaped structure is provided in the heating plate; the insulating layers (36) are high temperature resistant aluminum silicate felts and are 20-30 mm thick; the heating pipe is connected with the master control system (13).

4. The selective laser melting forming device for the multiple metal powder materials as claimed in claim 1, wherein a plurality of heating grooves (46) are provided on the substrate (39); a heating wire (48) and a second temperature measuring thermocouple (47) are provided in each of the heating grooves (46); the heating wire (48) and the second temperature measuring thermocouple (47) all are connected with the master control system (13).

5. The selective laser melting forming device for the multiple metal powder materials as claimed in claim 1, wherein the leveling oil cylinders (40) are provided at four corners of the substrate (39); cylinder bodies of the leveling oil cylinders (40) are fixed on the bottom plate; piston rods are fixed on a bottom portion of the substrate (39); the leveling oil cylinders (40) are connected with the master control system (13).

6. The selective laser melting forming device for the multiple metal powder materials as claimed in claim 1, wherein the stress sensor (23) under the compaction roller (26) comprises a deformation body (51), a resistance strain sensor (50) and an analog-to-digital conversion circuit (49); the stress sensor (23) is connected with the master control system (13).

7. The selective laser melting forming device for the multiple metal powder materials as claimed in claim 1, wherein a transparent protective cover (3) is provided outside of the electron microscope (4) and the charge coupled device camera (9); the transparent protective cover (3) is made of a transparent quartz glass; the electron microscope (4) and the charge coupled device camera (9) are connected with the master control system (13).

* * * * *